Patented Sept. 28, 1948

2,450,116

UNITED STATES PATENT OFFICE 2,450,116

PREPARATION OF BETA-LACTONES

John R. Caldwell, Kingsport, Tenn., assignor to Eastman Kodak Company, Rochester, N. Y., a corporation of New Jersey No Drawing. Application July 23, 1947, Serial No. 763,149

19 Claims. (Cl. 260—344)

This invention relates to an improved process for preparing beta-lactones of beta-hydroxy carboxylic acids by reacting a ketene with carbonyl-containing compounds, such as aldehydes, ketones, diketones and ketoesters, hereinafter referred to as carbonyl compounds.

Staudinger first showed that keto-ketenes, such as diphenyl ketene, react with aldehydes and ketones to give lactones (Annalen 384, 1911, pages 38 to 135 and Annalen 380, 1911, page 243), and with unsaturated ketones to give unsaturated hydrocarbons (Annalen 401, 1913, page 263). It has long been known that aldo-ketenes, such as methyl ketene, readily polymerize to the dimer under ordinary conditions of temperature and pressure. Boese in U. S. Patent No. 2,108,427, dated February 15, 1939, shows that ketene dimers react with aldehydes to produce unsaturated ketones. The process of my invention, however, is applicable both to aldo- and keto-ketenes although ketene itself is usually preferred.

Kung in U. S. Patent No. 2,356,459, dated August 22, 1944, shows the reaction between ketenes and ketones to produce beta-lactones, a catalyst of the Friedel-Crafts type being employed. Gwynn and Degering in U. S. Patent 2,383,965, dated September 4, 1945, show that ketene reacts with ketones in the presence of acid catalysts to produce enol esters. In view of the teaching by the prior art that acid-type catalysts ordinarily produce enol esters when ketene reacts with a ketone, it was most surprising to find that the present catalysts lead to the formation of beta-lactones instead.

An object of the present invention is to provide an improved process for preparing beta-lactones by reacting a ketene with a carbonyl compound whereby yields of 75 to 85% may be attained.

A further object of the present invention is to provide an improved process for preparing beta-lactones by reacting a ketene with a carbonyl-containing compound in the presence of a catalyst comprising a metallic salt of perchloric acid. Other objects will become apparent from a consideration of the following examples.

Aldehydes which may be utilized in my invention are represented by the formula:

where R stands for hydrogen; an alkyl radical, such as methyl, ethyl, propyl, butyl, secondary butyl and tertiary butyl radicals, i. e., an alkyl group of the formula $C_nH_{2n+1}$ where $n$ is a positive integer of 1 to 4; an aralkyl radical, such as benzyl or beta-phenyl ethyl; and an aryl group such as phenyl, ortho, meta, and para tolyl, i. e., an aryl radical of the benzene series having 6 to 10 carbon atoms. Aldehydes where R is hydrogen or methyl are preferred for the purpose of my invention. However, other aldehydes may likewise be employed.

Ketones which may be employed in my process have the formula:

wherein $R'$ and $R^2$ represent the same or different alkyl groups, such as methyl, ethyl, propyl, butyl, secondary and tertiary butyl, i. e., an alkyl radical having the formula $C_nH_{2n+1}$, where $n$ is a positive integer from 1 to 4; an aryl group, such as phenyl, ortho-, meta-, and para-tolyl, i. e., an aryl group of the benzene series having 6 to 10 carbon atoms or an aralkyl group, such as benzyl or beta-phenyl ethyl. Acetone is the preferred ketone due to its commercial availability. However, other ketones may likewise be used expeditiously.

The diketones which I prefer to use in my process have the formula:

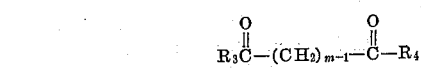

wherein $R_3$ and $R_4$ represent an alkyl radical, such as methyl, ethyl, propyl, isopropyl, butyl, secondary and tertiary butyl, i. e., an alkyl radical of the formula $C_nH_{2n+1}$ wherein $n$ is a positive integer of 1 to 4, and $m$ represents a positive integer of 1 to 5.

Suitable keto-esters which may be used have the formula:

wherein $R_5$ and $R_6$ represent the same or different alkyl radicals, such as methyl, ethyl, propyl, isopropyl, butyl, secondary and tertiary butyl, and $m$ is a positive integer from 1 to 5.

Typical carbonyl compounds which may be used in practicing my invention are formaldehyde, acetaldehyde, propionaldehyde, butyraldehyde, isobutyraldehyde, benzaldehyde, phenylacetaldehyde, beta phenyl propionaldehyde, tolyl aldehyde, acetone, diethyl ketone, methyl ethyl ketone, methyl propyl ketone, methyl butyl ketone, acetophenone, benzophenone, methyl benzyl ketone, paramethyl acetophenone, biacetyl, acetyl acetone, hexandione 2,4, methyl pyruvate, ethyl pyruvate, methyl and ethyl acetoacetates, methyl and ethyl levulinates and the like. In addition, compounds not set forth in the above formulae, such as crotonaldehyde, furfuraldehyde, methyl cyclohexyl ketone, methyl isopropenyl ketone, and other olefinic ketones or aldehydes likewise may be employed.

Ketenes which may be employed in my invention have the formula:

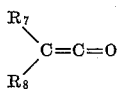

wherein $R_7$ and $R_8$ represent hydrogen, the same or different alkyl radicals, such as methyl, ethyl, propyl, isopropyl, butyl, secondary and tertiary butyl, i. e., an alkyl radical having 1 to 4 carbon atoms, an aryl radical, such as phenyl, ortho-, meta-, and para-tolyl, i. e., an aryl radical of the benzene series having 6 to 10 carbon atoms or an aralkyl radical, such as benzyl, beta phenyl ethyl and the like. Ketenes where $R_7$ and $R_8$ are hydrogen or a methyl radical represent a preferred group.

Generally any metallic salt of perchloric acid may be used as a catalyst. The metals of groups II and VIII of the periodic system are preferred, and I may use the salts of such metals as iron, cobalt, nickel, zinc, cadmium, calcium, stannous tin and the like. Other metallic salts, such as the sodium, potassium, and cupric perchlorates may be used. The amount of catalyst may be varied with the type of carbonyl compound being used, and amounts of catalyst may vary from 0.01% to 2% based on the weight of the carbonyl compound. For practical purposes an amount of catalyst of from 0.1% to 0.5% based on the weight of the carbonyl compound may be used.

The temperature of my process may likewise be varied according to the type of compound being reacted. Care should be taken to avoid too rapid an elevation of temperature since betalactones readily lose carbon dioxide and form unsaturated hydro-carbons. The temperature may be as low as —40° C. or as high as 50° C., but generally a temperature within the range of 0° C. to 30° C. is preferred. Formaldehyde, for example, will react with ketene within the temperature range of 0° to 50° C. while acetone reacts at a temperature of from 5° to 40° C.

Solvents, such as benzene, toluene, heptane, dioxane, ethyl ether, isopropyl ether, carbon tetrachloride, carbon bisulfide and the like, may or may not be used. In order to avoid separation of a solvent after the reaction has been completed, it is preferred to use a solution of the lactones produced from a previous run.

When an aldehyde is the carbonyl compound to be reacted, a more uniform process usually results if the ketene and aldehyde, in gaseous form and in substantially equimolar quantities, are passed into a stirred solution of the metallic perchlorate in the lactone, while in other cases the gaseous ketene may be passed into a stirred solution of the metallic perchlorate catalyst, carbonyl compound, and lactone. However, it is not necessary always to use a gaseous aldehyde or a liquid ketone, diketone, or keto-ester. The temperature at which the condensation takes place is the critical factor to be considered and it is, therefore, to be understood that my process may be batchwise or continuous, or may be performed in the liquid or vapor phase. When a continuous process is used, any of the conventional apparatus available to the art for such purposes may be employed. The catalyst may be supported on some inert solid carrier therefor, and the flow of reactants may be counter-current or otherwise. I prefer, however, when using a continuous process to carry out my invention in the manner described in the copending application of Hugh J. Hagemeyer and Delmer C. Cooper, Serial No. 660,286, filed April 6, 1946. The pressures may be atmospheric or superatmospheric. If the ketene has been secured by the pyrolysis of acetic acid, it may be advantageous to carry out the process in a scrubber-type reactor. Such a process is described in the copending application of Herbert G. Stone, Serial No. 660,285, filed April 6, 1946.

In some instances the beta-lactone may be distilled directly from the neutralized reaction mixture. However, when the lactone of an olefinic-carbonyl compound has been prepared, ordinarily such a mode of separation cannot be realized even under diminished pressures, since decarboxylization of the formed lactone may follow. Here an extraction or separation by gravity is indicated. When the lactone of a low-boiling carbonyl compound, such as formaldehyde, acetaldehyde, etc. has been formed, the lactone may be separated by flash distillation, i. e., passing the warm reaction mixture into a heated chamber under reduced pressure, the low-boiling components thereof being distilled off, and a residue consisting primarily of the desired lactone remaining. The lactone may then be further purified by flash distillation under reduced pressures, or used without purification as a solvent for a subsequent condensation. This lactone solution need not correspond to the lactone being produced, however for practical purposes it is preferred to use a lactone solution which corresponds to the lactone being formed. When desired, the lactone solvent and formed lactone need not correspond, if the lactone solution may be separated from the formed lactone by fractional distillation or if the mixture of lactones is intended to be utilized without purification in the preparation of other compounds such as synthetic resins, polymers and the like.

The following examples are given to further characterize my invention:

*Example I.—Preparation of beta-propionlactone*

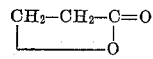

Gaseous ketene and gaseous formaldehyde are mixed in approximately equimolar ratios and are led into a stirred solution of .2 g. zinc perchlorate in 50 g. beta-propionlactone, maintained at a temperature of 0°–15° C. The passage of the gaseous reactants into the catalyst solution is continued until 1.0 g. moles of each reactant has been added. The reaction mixture is then stirred with .5 g. sodium carbonate in 2 cc. water to neutralize the catalyst. The product is subjected to a high vacuum flash distillation to remove the catalyst. After re-distilling, a 70 to 80% yield of beta-propionlactone boiling at 37 to 40° C., 4 mm. pressure is obtained. In a similar manner beta-butyrolactone was prepared by reacting ketene with acetaldehyde using zinc perchlorate as a catalyst, an excellent yield being attained. The formula for beta-butyrolactone is:

*Example II.—Preparation of beta-metyl-beta-butyrolactone*

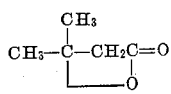

Zinc perchlorate (0.5 g.) is dissolved in 200 cc. acetone and ketene is passed through the solution at 20°–30° C. with efficient stirring. After 1 mol of ketene has been passed in, the catalyst is neutralized by adding 0.5 g. sodium carbonate in 1 cc. water. The product is decanted from the residue and distilled in vacuum. A yield of 45–50% beta-methyl-beta-butyrolactone, based on the ketene consumed, is obtained.

*Example III.—Preparation of beta-carboethoxymethyl-beta-butyrolactone*

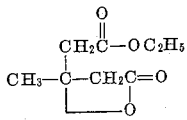

Cobalt perchlorate (1.0 g.) is dissolved in 400 g. ethyl acetoacetate and ketene is passed into the solution at 25° C. with efficient stirring. The reaction is continued until approximately 2 mols of ketene have been passed in. The catalyst is neutralized by adding 1 g. sodium bicarbonate suspended in 2 cc. of water. The product is decanted from the residue and distilled in vacuum. The lactone loses $CO_2$ during the distillation to give the ethyl ester of 3-methyl-3-butenoic acid

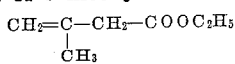

B. Pt. 54.5°/20 mm.

*Example IV.—Preparation of beta-acetylmethyl-beta-butyrolactone*

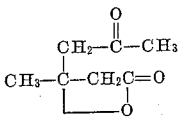

Ketene is passed into 300 g. acetyl acetone containing 1.0 g. magnesium perchlorate. The temperature is maintained at 15–20° C. After 2 mols ketene have been passed into the solution, the catalyst is neutralized by adding 1 g. sodium carbonate in 2 cc. water. The product is decanted from the residue and distilled in vacuum. During the distillation, the lactone decomposes by losing $CO_2$ to give 2-methyl-pentene-1-one-4 in 30–40% yield, B. Pt. 127°/735. As a byproduct, some di-isopropenyl methane is obtained, B. Pt. 88°/735.

If desired, in lieu of securing the beta-lactone directly from the neutralized reaction mixture, it is possible to hydrolyze the beta-lactone to a hydroxy carboxylic acid and subsequently dehydrate this acid to its corresponding unsaturated derivative. For example:

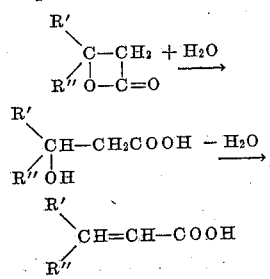

where R' and R'' represent hydrogen or a hydrocarbon radical.

*Example V.—Preparation of beta, beta-dimethyl acrylic acid*

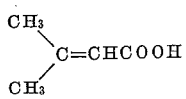

In this example, the lactone was not separated from the reaction mixture, but was hydrolyzed by steam distillation to the unstable beta-hydroxy acid:

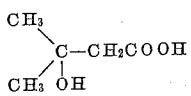

which was then dehydrated to the dimethyl acrylic acid.

Calcium perchlorate (.5 g.) is dissolved in 150 cc. of acetone and ketene is passed through the solution at 20 to 30° C. with efficient stirring. After one mole of ketene has been passed in, the acetone solution is poured into 100 cc. of 15% hydrochloric acid. The mixture is then steam distilled. After the acetone and most of the water has been removed, crystals of dimethyl acrylic acid begin to form in the condenser. The product is collected by extracting from the water solution with ether to give a yield of 40 to 50% based on the ketene consumed. After recrystallizing from water, the dimethyl acrylic acid titrated to an equivalent weight of 99.5; theoretical equivalent weight was 100.

*Example VI.—Preparation of beta-ethylcrotonic acid*

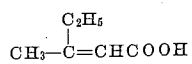

Methyl ethyl ketone is treated with ketene using magnesium perchlorate as catalyst as described in Example V above. A yield of 50 to 60% beta ethyl crotonic acid is obtained based on the amount of ketene consumed.

By selecting different carbonyl compounds it is possible to prepare other beta-lactones. For example, by replacing the formaldehyde of Example I or the acetone of Example II by 1.0 g. moles of butyraldehyde, beta-caprolactone having the following formula was produced:

Similarly it is possible to obtain beta-carbomethoxymethyl-, beta-butyrolactone by passing ketene into a stirred solution of zinc perchlorate, methyl acetoacetate and a solvent for the reactants as described above. The reaction is illustrated as follows:

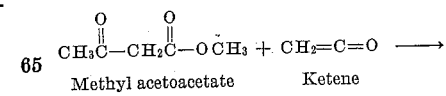
Methyl acetoacetate    Ketene

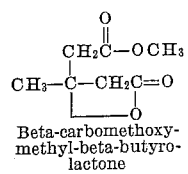
Beta-carbomethoxymethyl-beta-butyrolactone

Beta-propionylmethyl-beta-butyrolactone may be attained by passing ketene into a stirred solution of zinc, magnesium, or cobalt perchlorate and propionyl acetone. This reaction is:

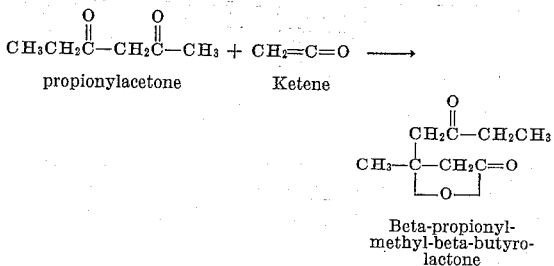

propionylacetone    Ketene

Beta-propionyl-methyl-beta-butyro-lactone

The beta-lactones of my invention, which are attained with difficulty by using the Friedel-Crafts type catalyst of the prior art, are valuable intermediates for the preparation of unsaturated acids, hydroxy acids, unsaturated esters, amides, or nitriles.

I claim:

1. A process for preparing β-lactones which comprises reacting at temperature of from $-40°$ C. to 50° C. a ketene having the formula:

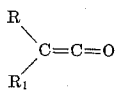

wherein R and $R_1$ each represents a member selected from the group consisting of a hydrogen atom, a methyl group, an ethyl group and a phenyl ($C_6H_5-$) group, with a carbonyl compound selected from the group represented by the four general formulas:

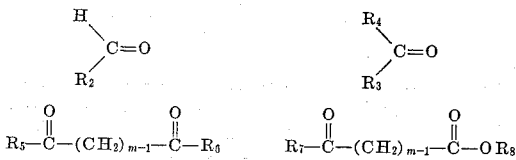

wherein $R_2$ represents a member selected from the group consisting of a hydrogen atom, an alkyl group having the formula $C_nH_{2n+1}$ wherein $n$ is a positive integer from 1 to 4, a benzyl group, a β-phenylethyl group, and a phenyl group ($C_6H_5-$), $R_3$ and $R_4$ each represents a member selected from the group consisting of an alkyl group having the formula $C_nH_{2n+1}$ wherein $n$ is a positive integer from 1 to 4, a benzyl group, a β-phenylethyl group and a phenyl ($C_6H_5-$) group, $R_5$, $R_6$, $R_7$ and $R_8$ each represents an alkyl group having the formula $C_nH_{2n+1}$ wherein $n$ is a positive integer from 1 to 4 and $m$ represents a positive integer from 1 to 3 in the presence of a catalyst selected from the group consisting of zinc, copper, calcium, cadmium, magnesium, cobalt, nickel, stannous tin, and ferric perchlorates.

2. A process for preparing β-lactones which comprises reacting at a temperature of from $-40°$ C. to 50° C. a ketene having the formula:

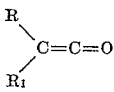

wherein R and $R_1$ each represents a member selected from the group consisting of a hydrogen atom, a methyl group, an ethyl group and a phenyl ($C_6H_5-$) group, with a carbonyl compound selected from the group represented by the four general formulas:

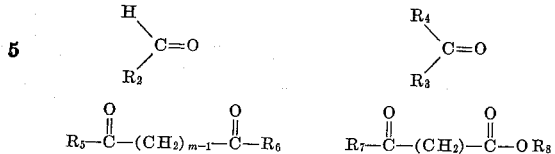

wherein $R_2$ represents a member selected from the group consisting of a hydrogen atom, an alkyl group having the formula $C_nH_{2n+1}$ wherein $n$ is a positive integer from 1 to 4, a benzyl group, a β-phenylethyl group, and a phenyl group ($C_6H_5-$), $R_3$ and $R_4$ each represents a member selected from the group consisting of an alkyl group having the formula $C_nH_{2n+1}$ wherein $n$ is a positive integer from 1 to 4, a benzyl group, a β-phenylethyl group and a phenyl ($C_6H_5-$) group, $R_5$, $R_6$, $R_7$ and $R_8$ each represents an alkyl group having the formula $C_nH_{2n+1}$ wherein $n$ is a positive integer from 1 to 4 and $m$ represents a positive integer from 1 to 3 in the presence of from 0.01% to 2% by weight based on the carbonyl compound of a catalyst selected from the group consisting of zinc, copper, calcium, cadmium, magnesium, cobalt, nickel, stannous tin, and ferric perchlorates, and in the presence of an inert solvent.

3. A process for preparing β-lactones which comprises reacting at a temperature of from $-40°$ to 50° C. a ketene having the formula:

wherein R and $R_1$ each represents a member selected from the group consisting of a hydrogen atom, a methyl group, an ethyl group and a phenyl ($C_6H_5-$) group, with a carbonyl compound selected from the group represented by the four general formulas:

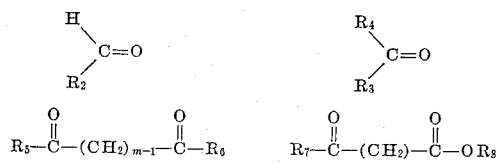

wherein $R_2$ represents a member selected from the group consisting of a hydrogen atom, an alkyl group having the formula $C_nH_{2n+1}$ wherein $n$ is a positive integer from 1 to 4, a benzyl group, a β-phenylethyl group, and a phenyl group ($C_6H_5-$), $R_3$ and $R_4$ each represents a member selected from the group consisting of an alkyl group having the formula $C_nH_{2n+1}$ wherein $n$ is a positive integer from 1 to 4, a benzyl group, a β-phenylethyl group and a phenyl ($C_6H_5-$) group, $R_5$, $R_6$, $R_7$ and $R_8$ each represents an alkyl group having the formula $C_nH_{2n+1}$ wherein $n$ is a positive integer from 1 to 4 and $m$ represents a positive integer from 1 to 3 in the presence of from 0.01% to 2% by weight based on the carbonyl compound of a catalyst selected from the group consisting of zinc, copper, calcium, cadmium, magnesium, cobalt, nickel, stannous tin, and ferric perchlorates, and in the presence of a β-lactone which corresponds to the lactone being formed.

4. A process for preparing a β-lactone which comprises reacting at a temperature of from $-40°$ C. to 50° C. ketene ($CH_2=C=O$) with a carbonyl compound selected from the group represented by the four general formulas:

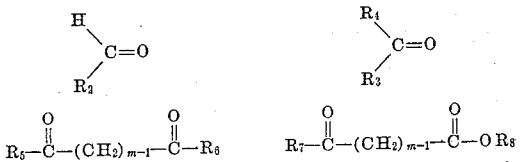

where $R_2$ represents a member selected from the group consisting of a hydrogen atom, an alkyl group having the formula $C_nH_{2n+1}$ wherein $n$ is a positive integer from 1 to 4, a benzyl group, a β-phenylethyl group, and a phenyl group ($C_6H_5$—), $R_3$ and $R_4$ each represents a member selected from the group consisting of an alkyl group having the formula $C_nH_{2n+1}$ wherein $n$ is a positive integer from 1 to 4, a benzyl group, a β-phenylethyl group and a phenyl ($C_6H_5$—) group, $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3 in the presence of a catalyst selected from the group consisting of zinc, copper, calcium, cadmium, magnesium, cobalt, nickel, stannous tin, and ferric perchlorates.

5. A process for preparing a β-lactone which comprises reacting at a temperature of from —40° C. to 50° C. ketene ($CH_2=C=O$) with a carbonyl compound selected from the group represented by the four general formulas:

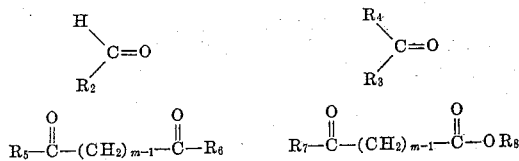

wherein $R_2$ represents a member selected from the group consisting of a hydrogen atom, an alkyl group having the formula $C_nH_{2n+1}$ wherein $n$ is a positive integer from 1 to 4, a benzyl group, a β-phenylethyl group, and a phenyl group ($C_6H_5$—), $R_3$ and $R_4$ each represents a member selected from the group consisting of an alkyl group having the formula $C_nH_{2n+1}$ wherein $n$ is a positive integer from 1 to 4, a benzyl group, a β-phenylethyl group and a phenyl ($C_6H_5$—) group, $R_5$, $R_6$, $R_7$ and $R_8$ each represents an alkyl group having the formula $C_nH_{2n+1}$ wherein $n$ is a positive integer from 1 to 4 and $m$ represents a positive integer from 1 to 3 in the presence of from 0.01% to 2% by weight based on the carbonyl compound of a catalyst selected from the group consisting of zinc, copper, calcium, cadmium, magnesium, cobalt, nickel, stannous tin, and ferric perchlorates, and in the presence of an inert solvent.

6. A process for preparing β-lactones which comprises reacting at a temperature of —40° C. to 50° C. a ketene having the formula:

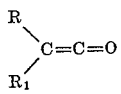

wherein R and $R_1$ each represents a member selected from the group consisting of a hydrogen atom, a methyl group, an ethyl group and a phenyl group ($C_6H_5$—) with an aldehyde represented by the formula:

wherein $R_2$ represents an alkyl group of the formula $C_nH_{2n+1}$ wherein $n$ is a positive integer of 1 to 4, in the presence of from 0.01% to 2% by weight based upon the aldehyde used as a catalyst selected from the group consisting of zinc, copper, calcium, cadmium, magnesium, cobalt, nickel, stannous tin, and ferric perchlorates, in the presence of an inert solvent.

7. A process for preparing β-lactones which comprises reacting at a temperature of —40° C. to 50° C. a ketene having the formula:

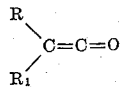

wherein R and $R_1$ each represents a member selected from the group consisting of a hydrogen atom, a methyl group, an ethyl group and a phenyl group ($C_6H_5$—) with an aldehyde represented by the formula.

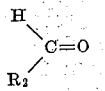

wherein $R_2$ represents an alkyl group of the formula $C_nH_{2n+1}$ wherein $n$ is a positive integer of 1 to 4, in the presence of from 0.01% to 2% by weight based upon the aldehyde used of a catalyst selected from the group consisting of zinc, copper, calcium, cadmium, magnesium, cobalt, nickel, stannous tin, and ferric perchlorates, and in the presence of a β-lactone which corresponds to the lactone being formed.

8. A process for preparing β-lactones which comprises reacting at a temperature of —40° C. to 50° C. a ketene having the formula:

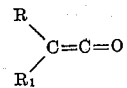

wherein R and $R_1$ each represents a member selected from the group consisting of a hydrogen atom, a methyl group, an ethyl group and a phenyl group ($C_6H_5$—) with a ketone represented by the formula:

wherein $R_3$ and $R_4$ each represents a member selected from the group consisting of an alkyl group of the formula $C_nH_{2n+1}$ wherein $n$ is a positive integer from 1 to 4, a benzyl group, a β-phenyl ethyl group, and a phenyl group ($C_6H_5$—) in the presence of a catalyst selected from the group consisting of zinc, copper, calcium, cadmium, magnesium, cobalt, nickel, stannous tin, and ferric perchlorates, in the presence of an inert solvent.

9. A process for preparing β-lactones which comprises reacting at a temperature of —40° C. to 50° C. a ketene having the formula:

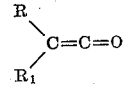

wherein R and $R_1$ each represents a member selected from the group consisting of a hydrogen atom, a methyl group, an ethyl group and a phenyl group ($C_6H_5$—) with a ketone represented by the formula:

wherein $R_3$ and $R_4$ each represents a member selected from the group consisting of an alkyl group of the formula $C_nH_{2n+1}$ wherein $n$ is a positive integer from 1 to 4, a benzyl group, a β-phenyl ethyl group, and a phenyl group ($C_6H_5-$) in the presence of from 0.01% to 2% by weight based on the ketone of a catalyst selected from the group consisting of zinc, copper, calcium, cadmium, magnesium, cobalt, nickel, stannous tin, and ferric perchlorates, in the presence of an inert solvent.

10. A process for preparing a β-lactone which comprises reacting at a temperature of from $-40°$ C. to $50°$ C. ketene ($CH_2=C=O$) with a ketone represented by the formula:

wherein $R_3$ and $R_4$ each represents a member selected from the group consisting of an alkyl group of the formula $C_nH_{2n+1}$ wherein $n$ is a positive integer from 1 to 4, a benzyl group, a β-phenyl ethyl group, and a phenyl group ($C_6H_5-$) in the presence of from 0.01% to 2% by weight based on the ketone of a catalyst selected from the group consisting of zinc, copper, calcium, cadmium, magnesium, cobalt, nickel, stannous tin, and ferric perchlorates, in the presence of an inert solvent.

11. A process for preparing β-lactones which comprises reacting ketene ($CH_2=C=O$) with an aldehyde represented by the formula:

wherein $R_2$ represents an alkyl group of the formula $C_nH_{2n+1}$ where $n$ is a positive integer of from 1 to 4, in the presence of from 0.01% to 2% based on the weight of the aldehyde used of a catalyst selected from the group consisting of zinc, copper, cadmium, calcium, magnesium, cobalt, nickel, stannous tin and ferric perchlorates at a temperature of from $-40°$ C. to $+50°$ C., in the presence of an inert solvent.

12. A process of preparing β-propiolactone which comprises reacting ketene with formaldehyde in the presence of from about 0.01% to 2% based on the weight of formaldehyde of a catalyst selected from the group consisting of zinc, copper, calcium, cadmium, magnesium, cobalt, nickel, stannous tin, and ferric perchlorates at a temperature of from $0°-15°$ C.

13. A process for preparing β-propiolactone which comprises reacting ketene with formaldehyde in the presence of from 0.01% to 2% zinc perchlorate based on the weight of formaldehyde and at a temperature of from $0°-15°$ C.

14. A process for preparing β-propiolactone which comprises reacting ketene with formaldehyde in the presence of from 0.01% to 2% zinc perchlorate based on the weight of formaldehyde and at a temperature of from $0°-15°$ C. in the presence of an inert solvent.

15. A process for preparing β-propiolactone which comprises reacting at a temperature of from $0°-15°$ C. ketene with formaldehyde in the presence of from about 0.01% to 2% based on the weight of formaldehyde of a catalyst selected from the group consisting of zinc, copper, calcium, cadmium, magnesium, cobalt, nickel, stannous tin, and ferric perchlorates in the presence of β-propiolactone as a solvent.

16. A process for preparing β-butyrolactone which comprises reacting at a temperature of from $0°-15°$ C. ketene with acetaldehyde in the presence of a catalyst selected from the group consisting of zinc, copper, calcium, cadmium, magnesium, cobalt, nickel, stannous tin, and ferric perchlorates.

17. A process for preparing β-butyrolactone which comprises reacting at a temperature of from $0°-15°$ C. ketene with acetaldehyde in the presence of from about 0.01% to 2% based on the weight of acetaldehyde of zinc perchlorate and in the presence of an inert solvent.

18. The process for preparing β-lactones which comprises reacting at a temperature of from $-40°$ C. to $50°$ C. ketene ($CH_2=C=O$) with acetone in the presence of 0.01% to 2% by weight based on the acetone used of a catalyst selected from the group consisting of zinc, copper, calcium, cadmium, magnesium, cobalt, nickel, stannous tin, and ferric perchlorates in the presence of an inert solvent.

19. The process for preparing β-lactones which comprises reacting at a temperature of from $-40°$ C. to $50°$ C. ketene ($CH_2=C=O$) with acetone in the presence of 0.01% to 2% by weight based on the acetone used of a catalyst selected from the group consisting of zinc, copper, calcium, cadmium, magnesium, cobalt, nickel, stannous tin, and ferric perchlorates.

JOHN R. CALDWELL.

No references cited.